Patented May 28, 1946

2,401,259

UNITED STATES PATENT OFFICE 2,401,259

FAT-FRYING COMPOSITIONS

Robert L. Lloyd, Laurelton, N. Y., and Ben F. Buchanan, Leonia, N. J., assignors to American Maize-Products Company, a corporation of Maine No Drawing. Application April 8, 1943, Serial No. 482,344

2 Claims. (Cl. 99—94)

This invention relates to fat-frying food compositions and method of making. More particularly the invention relates to compositions for mixing with water in making leavened food products by either deep fat-frying or surface fat-frying, as, for example, doughnuts, pancakes and waffles.

When such articles of conventional compositions are cooked by heating in contact with the frying fat, they absorb a large amount of the frying fat so that the total fat in the finished goods in the case of typical commercial doughnuts, for example, amounts to about 27 to 31%.

Because fats are relatively expensive, this absorption of fat greatly increases the cost. Because the fat for frying is frequently reused repeatedly, being simply made up by addition of fresh fat to the correct volume as the fat is depleted by use, the fat under the strong heating to which it is subjected undergoes some decomposition. As a result, the large amount absorbed and present in the finished goods results in inferior quality of product. Furthermore, the large quantity of fat, particularly fat in which decomposition has been initiated by repeated strong heating to frying temperatures, reduces the keeping qualities. Finally, excess fat on the surface of the doughnut gives to it a greasy feeling and taste. In case of doughnuts to which a sugar coating is applied, excess fat soaks into the coating in spots at least and makes it also somewhat greasy.

In making products by frying in deep fat, there has been difficulty also due to what is known in the industry as cores or coring. In the case of doughnuts, for example, the leavening of the dough, after the article is dropped into the frying fat, lightens the mass so that it floats to the top of the frying fat, with a half or so of the mass above the top level of the frying fat. With conventional doughnut compositions, the quicker leavening of the lower half of the doughnut, due to the quicker heating of that portion of the mass, causes non-uniformity and unevenness of texture; some of the upper part of the mass becomes more compact or less light than other parts. When the doughnut is turned over for frying the part that initially was the upper, there is produced a somewhat dense and usually undercooked core extending as a ring around the hole in the doughnut, in the part which was initially the upper. Overcoming of this coring consistently has been impossible heretofore, although careful manipulation and adjustment of formulas have been used to decrease somewhat the tendency to coring.

When compositions made as described herein are used, the formation of cores is either eliminated entirely or reduced to such an extent as to be substantially unobjectionable in the finished doughnut.

The invention provides a composition that not only reduces the formation of cores in deep fat-fried articles such as doughnuts, but also reduces the absorption of frying fats by the goods during frying. The invention provides, also, a composition which during frying, by either the deep fat- or the surface fat-frying process, gives a better browned product of more savory taste and better keeping qualities than obtained with previously known compositions.

The invention comprises a fat-frying composition for doughnuts and other fried flour products in which a portion of the sucrose used as the sweetening material in the composition is replaced by dried finely divided non-crystalline starch conversion syrup solids. In the preferred embodiment, the invention comprises also the method of making the fat-frying composition in which the shortening is mixed with the sweetening material including the syrup solids and in most cases with a part of the flour and all or part of usual minor ingredients, before the major part of the bulky ingredient, flour, is incorporated. This order of mixing promotes excellent contact of the sweetening material with the shortening so that, when the whole is later mixed with water preparatory to shaping and baking, the sweetening material ensures thorough emulsification of the shortening.

In illustrative preparations the replacement of a part of the sucrose by starch conversion syrup solids has resulted in a decrease in the total fat present in the finished article by approximately 4 to 5 units amounting to from 13% to 18% of the total fat content, as shown by the following analysis of two representative products.

| Sweetening material used | Fat in finished product | Decrease in total fat absorbed, per cent |
|---|---|---|
| All sucrose (cane sugar) | 27.7 | |
| 50% sucrose, 50% syrup solids | 24.1 | 13 |
| All sucrose (cane sugar) | 30.5 | |
| 50% sucrose, 50% syrup solids | 24.9 | 18 |

When it is understood that the doughnut composition as initially mixed includes a substantial proportion of shortening and also that a certain amount of fat may be absorbed without creating excessive greasiness or unwholesomeness of the product, it will be appreciated that the decrease of 4 units or so in the total fat of the finished doughnut is a very large proportion of the excessive fat of the doughnut made with the conventional sweetening agent.

It will be understood that the starch conversion syrup solids contain a large proportion of dextrose. Dextrose when used alone or with sucrose, however, does not decrease substantially the fat absorption by the leavened products during frying in fat. Our syrup solids are non-crystalline.

When the starch conversion syrup solids are used, there are realized greater smoothness of the dough or batter and the quicker development of a skin or crust over the outside of the goods when the goods are dropped into the hot oil in accordance with usual practice. The frying time for most goods is substantially reduced with our composition, say by a fifth or so. The goods also show a quicker rise to the surface of the fat when being cooked by the deep fat frying method. This quicked floating to the top shows retentivity for gas within the articles.

Except for the replacement of a part of the sucrose by syrup solids, with unexpected advantages, the compositions used for making a given product in accordance with the present invention and the technique of mixing, leavening, shaping, and cooking may be exactly the same as those that are conventionally used in making a given article with sucrose as the sole sweetening material. Better results, however, are obtained when the ingredients are mixed in the order referred to in detail elsewhere herein, this mixing order providing for the thorough blending of the shortening with the sweetening material alone or sweetening material with other minor ingredients before the bulky ingredient flour is incorporated.

As the flour used there is selected the one that is ordinarily chosen for making the particular article, as, for example, white wheat flour, whole wheat, or the like.

The sweetening material must be a mixture of sucrose such as cane or beet sugar with dried finely divided starch conversion syrup solids. The proportion of the said syrup solids is about 10 to 50 parts for 100 parts total sweetening, proportions of the syrup solids within the range of about 25 to 45 parts being particularly advantageous. When the proportion of the syrup solids is much in excess of 50 parts, then there are introduced difficulties in forming the desired intimate mixture with the other ingredients of the composition, too rapid browning during frying, and also a lack of sucrose taste in the finished product. When the proportion of the syrup solids is too low, the desirable effects from their use are lost. Thus with proportions of syrup solids below those stated, there is objectionable coring of the fried goods, improper browning, excessive absorption of fat, and opening up of texture with the formation of a coarse grained product.

As the starch conversion syrup solids, there is used the dried product of evaporating moisture from any common starch conversion syrup, as that from the conversion of starch from corn, potato, wheat, or rye, the evaporation being continued until the moisture content of the finished dried syrup solids is not substantially in excess of 5% and suitably about 1 to 3.5%. In any case the moisture content must be below that amount causing the particles of syrup solids to be tacky. The solids as used must be in finely divided condition, as, for example, so fine that practically all of the particles will pass through a 30 mesh screen and the major part of the particles will go through an 80 mesh screen.

The starch conversion syrup solids must have a dextrose equivalent within the range of approximately 25 to 70 parts of reducing sugars calculated as dextrose for 100 parts of the dried syrup solids. Preferably, the dextrose equivalent is about 35 to 50, particularly satisfactory results in commercial operations having been realized when the dextrose equivalent is approximately 40 to 45.

Particularly satisfactory for the present purpose is starch conversion syrup solids that are made by concentrating refined corn syrup and then spray drying the concentrated product so as to form minute particles of dried syrup solids that to a large extent are in the form of generally spheroidal hollow particles. Also the particles of starch conversion syrup solids used may be those produced by evaporating a refined starch conversion syrup to about the moisture content allowable in the finished solid product, drawing the concentrated syrup off to cooling pans, allowing the syrup to cool and solidify in the pans, and then grinding the product to required fineness for the present purpose.

Besides imparting the sucrose taste, the use of at least approximately an equal proportion of sucrose with the starch conversion syrup solids serves to space apart the starch conversion syrup solids and promote mixing with the other ingredients of the fat-frying composition.

As the leavening agent, there may be used baking powder or yeast, the conditions of use being those that are usual. Baking powder is ordinarily the leavener used. If yeast is used, the composition including the yeast and after being mixed to a dough with water is allowed to stand until the yeast gives one full rise, say for 2 to 4 hours and usually about 2½ to 3 hours, the exact time depending upon the temperature and the barometric pressure.

The shortening is that which is commonly used as, for example, hydrogenated oils from cottonseed, soya bean, and corn germs. Hydrogenated cottonseed oil is the preferred shortening.

Many of the fat-frying compositions of the present invention require milk solids such as skim milk powder or egg, added either as powdered egg yolks or whole eggs, or both milk solids and egg. Salt is commonly required not only for its taste but for other usual effects. Mace is sometimes used as a flavor.

Any ingredient such as one of those given or other ingredients for flavoring or other purpose used in conventional fat-frying composition may be used also in the present composition and in about the usual proportion, except for sucrose which is replaced in part as stated.

The selected ingredients are mixed dry, in any usual and convenient manner. To the resulting mix there is then added the required water to form the dough. In case the leavening agent used is yeast, the dough is allowed to stand the necessary time to give the rise. When chemical leavening material is used, the mixed dough is given the usual rest period before shaping. The dough is then shaped, as by a usual machine or by hand, and the shaped articles placed in or upon the frying fat. The fat is maintained at frying temperatures.

A particularly satisfactory method of mixing the dry ingredients includes incorporating the shortening by spraying. Thus it is desirable to make a blend of the sucrose, starch conversion syrup solids, and the other ingredients except the flour and leavener, spray and mix the shortening into the said blend, and then add and mix the flour and leavener. In a modification of this particular method, a part of the flour is mixed with the sweetener and other ingredients before the shortener is sprayed upon the mix.

When a spray machine is not available for mixing in the shortener it is best to cut in the shortening with the sweetening material, then incorporate the rest of the materials except flour and leavener, and finally introduce the flour and leavener. These two modifications are variations of the generic method which comprises mixing and shortening with the sweetening material before the bulky flour is added.

When the fat is sprayed, it should be at least moderately above the melting point so that it does not solidify before it can be mixed with the other ingredients.

When no spray machine is used and the fat is incorporated by mechanical mixing, the fat is preferably just above the melting point but not warm. The fat should be below 105° F. At temperatures of 105° F. or above, the mechanically incorporated fat causes agglomeration of particles of sweetening agent.

The invention will be further illustrated by description in connection with specific examples of the practice of it.

*Doughnut composition*

A doughnut composition is made with the order of mixing described above and of the following composition:

| Ingredient: | Parts by weight |
| --- | --- |
| Flour | 256 |
| Baking powder | 8 |
| Granulated sugar | 56 |
| Spray dried corn syrup solids | 20 |
| Hydrogenated cottonseed oil as shortening | 10 |
| Skim milk solids | 10 |
| Eggyolk, powdered | 10 |
| Salt | 2 |
| Mace | 1 |
| Total | 373 |

As in other of our fat frying compositions the proportions of the shortening and syrup solids are low. Thus it may be calculated from the above table that the proportions of syrup solids and shortening are approximately 7.8 and 3.9 parts, respectively, for 100 parts of flour in the substantially dry composition, the term "substantially dry" being used herein to distinguish the mix containing the normal moisture content of the flour, dried syrup solids, and other materials present from the same composition after being wet with water to make a dough or batter.

At the time of use, the above composition is mixed with approximately 133 parts of water, this proportion of water corresponding to about 1 gallon for an amount of the above composition including 16 pounds of flour. The wet composition is stirred into a thin bodied dough, preferably at a temperature around 70° F.

In another example, the baking powder of the formula is substituted by 4 to 4½ parts of yeast. After the yeast dough is made, it is allowed to stand for the time required for one full rise, usually not more than 4 hours and generally about 2½ to 3 hours.

In any case, the leavened dough is then formed into the desired shape and dropped into the frying fat where it is subjected to deep fat-frying in usual manner.

*Pancakes*

In making pancakes in a typical procedure, the mace and egg yolk are omitted from the above doughnut formula, proportions of the other ingredients that are used being those that are usual in pancake flour in which sucrose constitutes the sole sweetening agent, except that about 10 to 50 per cent of the sucrose is replaced by the syrup solids. Care is taken in making the final batter not to over-mix it.

When the batter has been made, it is poured upon the frying fat. Cooking is effected in usual manner.

*French crullers*

In making french crullers, the following composition and order of mixing are suitable.

There is formed an emulsion of 16 parts of hydrogenated cottonseed oil shortening in 32 parts of water in which there has been dissolved previously 6 parts of sweetening material consisting of half sucrose and half starch conversion syrup solids of kind described. This emulsion is heated to boiling. Then there is stirred into the boiling mixture 22 parts of flour and 4 parts of salt, the stirring and heating being continued until the mixture is thick and smooth. Then there are introduced slowly and with thorough stirring 32 parts of whole eggs, the eggs being weighed after discarding the shells.

The resulting dough is then shaped into french crullers which are deposited on a greased board. The greased board with the crullers is next submerged in the fat until the dough separates from the board. The board is then taken out and deep fat-frying of the crullers is completed.

It will be understood that it is intended to cover all changes and modifications of the example of the invention herein chosen for the purpose of illustration which do not constitute departures from the spirit and scope of the invention.

What we claim is:

1. A fat-frying composition comprising an intimate substantially dry mixture of flour, shortening in substantial proportion, a leavening agent, and sweetening material including sucrose and finely divided non-crystalline starch conversion syrup solids in dry condition and of reducing sugars content 25% to 70% calculated as dextrose, the proportion of syrup solids being 10 to 50 parts for 100 parts of total sweetening agent and the syrup solids serving, during mixing of the composition with water in forming a dough, to ensure intimate association of the shortening with the sweetening material and promote thorough emulsification and serving, during fat-frying of shaped masses of the dough, to decrease the absorption of the frying fat, improve the rate of browning of the goods, and eliminate non-uniformity of texture of the goods.

2. A doughnut composition comprising an intimate substantially dry mixture of flour, shortening, a leavening agent, skim milk solids, egg yolk, flavoring material including salt, and sweetening material including sucrose and finely divided non-crystalline starch conversion syrup solids in dry condition and of reducing sugars content 25% to 70% calculated as dextrose, the syrup solids and shortening being present in proportions not substantially in excess of 7.8 and 3.9 parts, respectively, for 100 parts by weight of the flour, the syrup solids being present in the proportion of 10 to 50 parts for 100 of sucrose and said solids, and the syrup solids serving to decrease development of cores on cooking and to decrease fat absorption during fat-frying of the composition in dough form.

ROBERT L. LLOYD.
BEN F. BUCHANAN.